United States Patent [19]

Yoshitoshi et al.

[11] Patent Number: 4,794,588
[45] Date of Patent: Dec. 27, 1988

[54] OPTICAL DISK PLAYER

[75] Inventors: You Yoshitoshi; Tsutomu Toyoguchi, both of Tokyo; Ryoji Takamatsu, Kanagawa, all of Japan

[73] Assignee: Sony Corporation, Tokyo, Japan

[21] Appl. No.: 130,302

[22] Filed: Dec. 9, 1987

Related U.S. Application Data

[63] Continuation of Ser. No. 816,105, filed as PCT JP85/00171 on Apr. 5, 1985, published as WO 85/04749 on Oct. 24, 1985, abandoned.

[30] Foreign Application Priority Data

Apr. 7, 1984 [JP] Japan ................................. 59-51286

[51] Int. Cl.⁴ .............................................. G11B 25/04
[52] U.S. Cl. .................................... 369/263; 369/247
[58] Field of Search ....................... 369/263, 247, 246

[56] References Cited

U.S. PATENT DOCUMENTS

| | | | |
|---|---|---|---|
| 2,756,016 | 7/1956 | Painter | 267/118 |
| 3,059,882 | 10/1962 | Staat | 369/263 |
| 4,387,453 | 6/1983 | Zolt | 369/263 |
| 4,731,777 | 3/1988 | Yoshitoshi et al. | 369/263 |

FOREIGN PATENT DOCUMENTS

| | | |
|---|---|---|
| 2188227 | 1/1974 | France . |
| 2218508 | 9/1974 | France . |
| 103402 | 8/1976 | Japan . |
| 57-50331 | 3/1982 | Japan . |
| 57-126805 | 8/1982 | Japan . |
| 58-225238 | 12/1983 | Japan . |
| 1399525 | 7/1975 | United Kingdom ................ 369/263 |
| 1466876 | 3/1977 | United Kingdom . |

Primary Examiner—Steven L. Stephan
Attorney, Agent, or Firm—Hill, Van Santen, Steadman & Simpson

[57] ABSTRACT

An optical disk player wherein a chassis having an optical pickup, a disk table and the like mounted thereon is supported by a frame using elastic support means at a plurality of positions, a vessel filled with a viscous fluid and sealed is provided at either the frame or the chassis, and a movable member provided at the other of the two is arranged in the sealed viscous fluid. With this arrangement, the slope of the Q curve in the resonant region is moderate enough to improve the antivibration characteristics, thus substantially eliminating sound omissions.

3 Claims, 7 Drawing Sheets

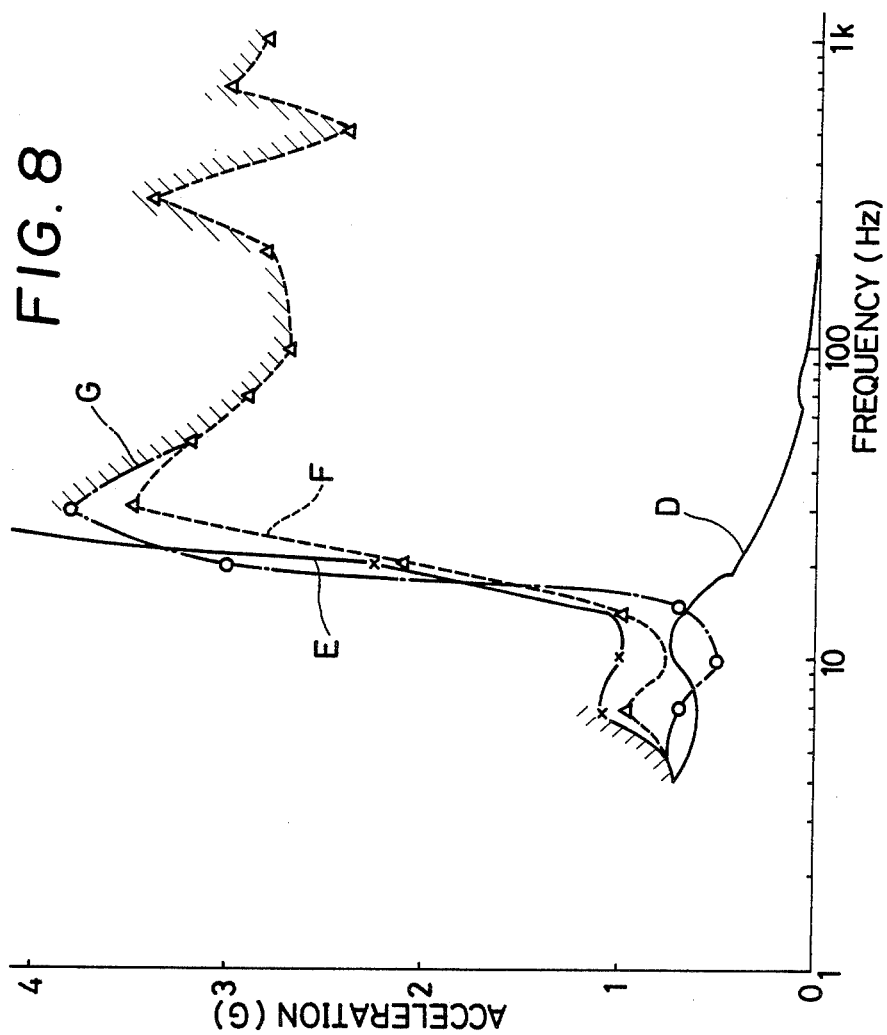

OPTICAL DISK PLAYER

This is a continuation of application Ser. No. 816,105, filed as PCT JP85/00171 on Apr. 5, 1985, published as WO85/04749 on Oct. 24, now abandoned.

TECHNICAL FIELD

The present invention relates to an optical disk player having an improved antivibration characteristic and suitable for use on a moving object such as an automobile or an aircraft.

BACKGROUND ART

In conventional optical disk players, a high-density signal recorded on disk is scanned with an optical pickup and reproduced. When such a player is mounted and used in a moving object such as an automobile or aircraft, sound omissions tend to occur due to vibrations of the moving object. To prevent this, a mechanism deck as a player unit is placed on a player frame using rubber dampers, thereby absorbing the vibrations. In this case, however, the Q value (i.e., Quality Factor) at the resonant region of the mechanism deck is inevitably large, and normal operation cannot be maintained.

A test result of the conventional optical disk player described above is illustrated in FIG. 1. FIG. 1 shows transfer characteristics of vibrations transferred to a mechanism deck when various mechanical members such as an optical pickup and a disk table are mounted on a chassis to constitute the mechanism deck, the mechanism deck is supported on a frame using only coil springs, and the frame is vibrated. In FIG. 1, characteristic curves A, B and C are obtained when vibration forces are given as 0.5 G, 0.1 G and 0.065 G, respectively, where G is the acceleration of gravity. As shown in FIG. 1, a considersably high Q value is obtained in a resonance region at a frequency of about 10 Hz. For example, vibration frequencies caused by various severe conditions during the operation of an abutomobile fall between 1 Hz and 125 Hz. Therefore, demand has arisen for improved antivibration characteristics of the conventional optical disk player.

DISCLOSURE OF INVENTION

The present invention has been made in consideration of the above situation, and has as its object to provide an optical disk player which tends not to cause sound omissions since the Q value is small in a resonant region, thereby improving the antiresonance characteristics.

In order to achieve the above object of the present invention, there is provided an optical disk player, wherein a chassis having an optical pickup, a disk table and the like mounted thereon is supported by a frame using elastic support means at a plurality of positions, a vessel sealing a viscous fluid therein is arranged at one of the frame and the chassis, and a movable member provided at the other of said frame and said chassis is arranged in the sealed viscous fluid. With this arrangement, the slope of the Q value in the resonant region is moderate enough to improve the antivibration characteristics, thus substantially eliminating sound omissions.

BRIEF DESCRIPTION OF DRAWINGS

FIG. 8 is a graph showing the vibration transfer and antivibration characteristics of the optical disk player of FIG. 2 in accordance with the test described with reference to FIG. 7;

BEST MODE OF CARRYING OUT THE INVENTION

Figure 1:
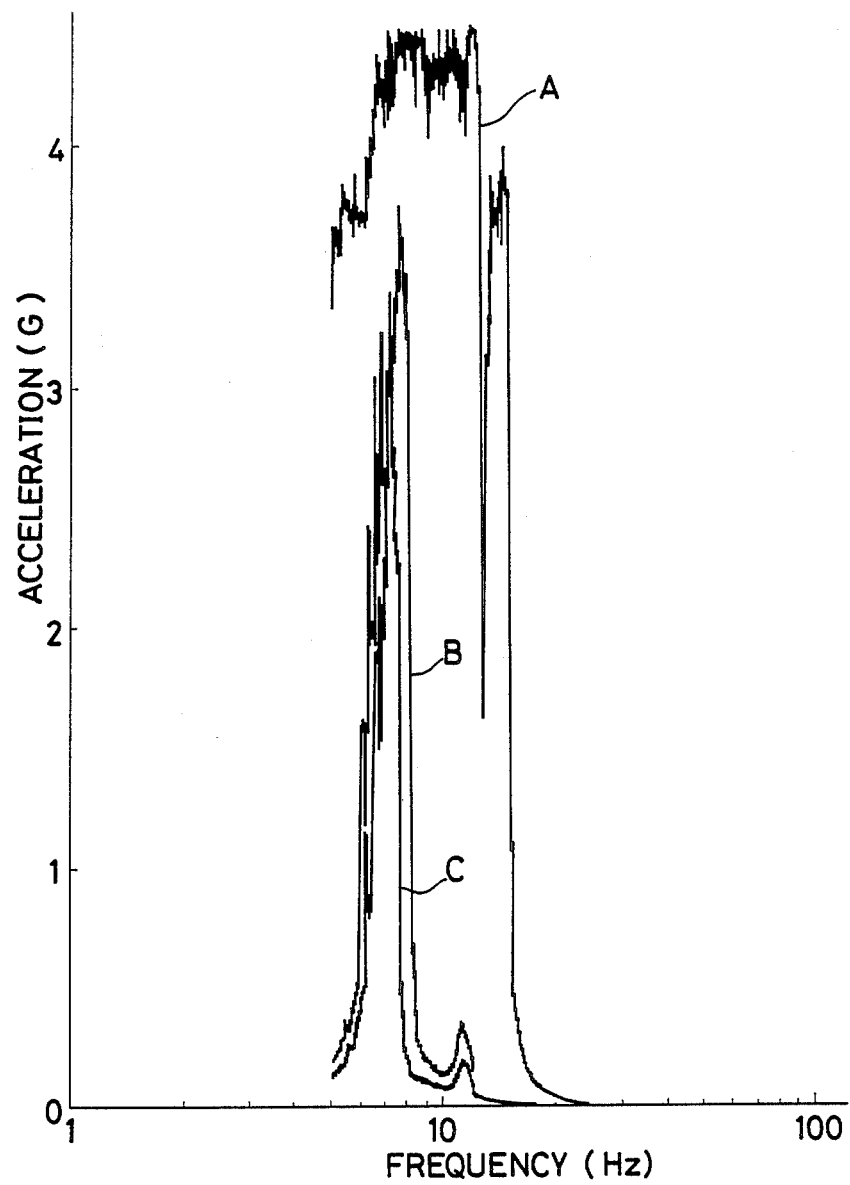
FIG. 1 is a graph showing the vibration transfer characteristics of a mechanism deck of a conventional optical disk player which is supported by a frame using only coil springs.

An embodiment of an optical disk player employing the present invention will be described with reference to the accompanying drawings.

A mechanism deck and a frame will be generally described with reference to FIGS. 2 and 3. The mechanism deck 1 comprises a chassis 12 on which are mounted an optical pickup 3 moved along a guide hole 2 formed in a chassis 12, a spindle motor (i.e., a disk table) 4 for driving a disk placed on the table and the like. A disk inserted from a direction indicated by arrow a is chucked and loaded on the spindle motor 4 by a chucking arm 5 and a disk chuck 6. The chucking arm 5 can be raised, and the disk chuck 6 is rotatably mounted at the extreme end of the chucking arm 5.

A frame 7 mounted on a housing (not shown) has an inverted U-shaped structure consisting of a pair of side plates 8a and 8b and a transverse connecting member 9 (FIG. 3) connecting the side plates 8a and 8b. The chassis 12 of the mechanism deck 1 is suspended from the frame 7 by four coil springs 10. More specifically, the mechanism deck 1 is supported horizontally by the coil springs 10 at four equal load points with respect to the center of gravity. The mechanism deck 1 is engaged with vessels 14 of dampers 11 mounted in the side plates 8a and 8b of the frame 7. The weight of the mechanism deck 1 is supported by the coil springs 10, so the weight does not act substantially on the dampers 11. Since the mechanism deck 1 is suspended from the frame 7 by the coil springs 10, a natural frequency f0 along the transverse direction (i.e., the horizontal direction) can be minimized.

Figure 4:
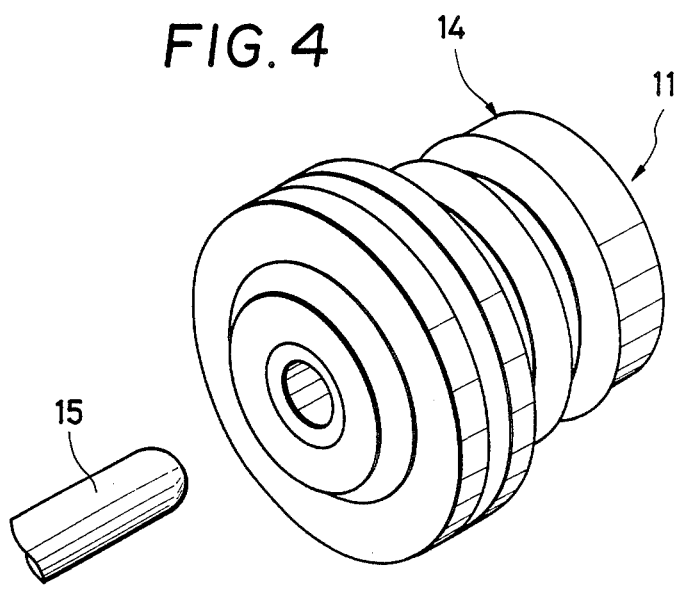
FIG. 4 is an enlarged exploded perspective view of the damper shown in FIG. 2.
Figure 5:
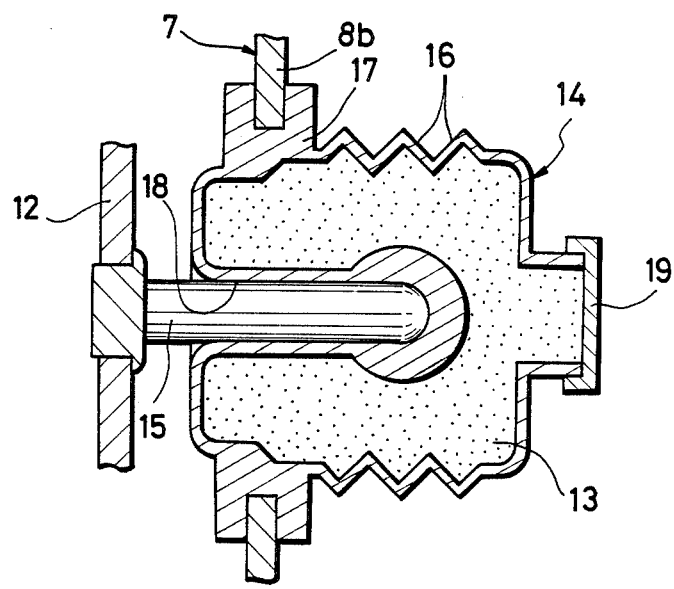
FIG. 5 is an enlarged longitudinal sectional view of the damper shown in FIG. 4.

As shown in FIGS. 4 and 5, each damper 11 comprises a vessel 14 mounted in the side plate 8b or 8a and filled with silicone oil 13 as a viscous fluid therein, and a rod 15 fixed to the chassis 12 and firmly fitted in the vessel 14. The vessel 14 has a thin flexible cylindrical bag with a bellows 16 which is made of silicone rubber or butyl rubber. A flange 17 at the front portion of the bag is engaged with the side plate 8b or 8a. An engaging hole 18 is formed at the center of the front poriton of the vessel 14, and the rod 15 fixed to the chassis 12 is firmly fitted in the engaging hole 18. By engaging the rod 15 with the vessel 14, the chassis 12 and hence the mechansim deck 1 are coupled to the frame 7 through the flexible vessel 14 and the silicone oil 13 as the viscous fluid. After the vessel 14 is filled with the silicone oil 13, a rear cover 19 is welded to seal the vessel 14. In this embodiment, the viscosity of silicone oil is 12,500 cP (centipoises).

Figure 6A:
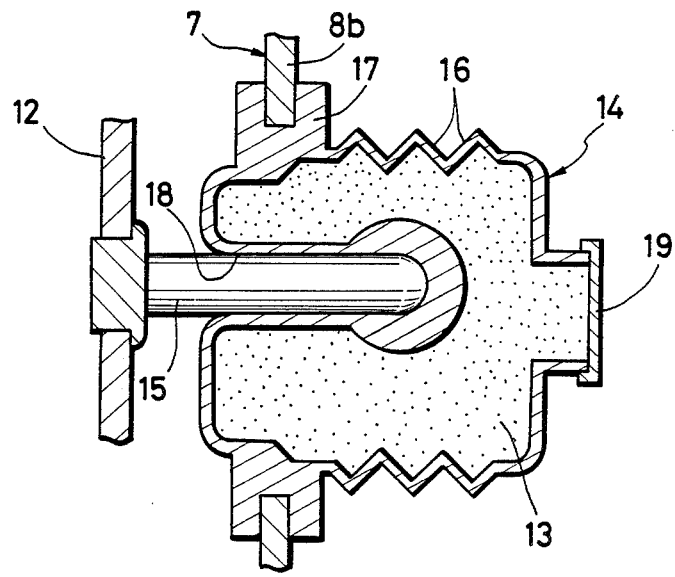
FIGS. 6A and 6B are the same longitudinal sectional views as FIG. 5 showing deformation states of the damper upon vertical and right-to-left vibrations of the frame, respectively.
Figure 6B:
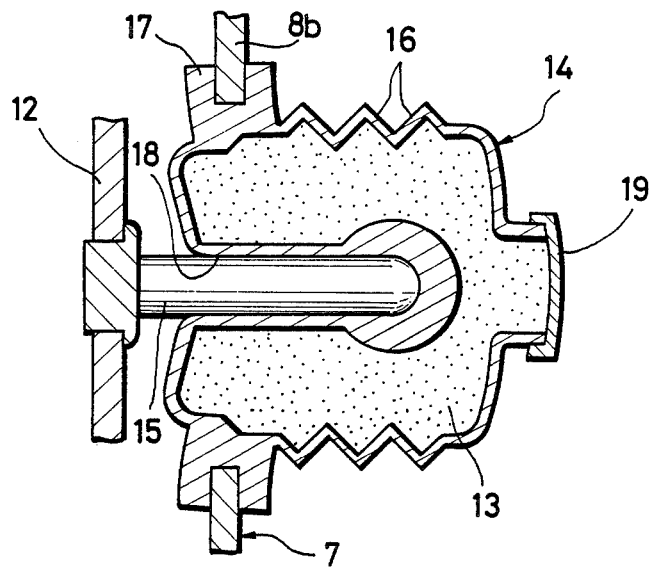

The operation of the damper 11 will be described with reference to FIGS. 6A and 6B. When the frame 7 is vibrated vertically, e.g., moved downward, the vessel 14 is also moved downward, as shown in FIG. 6A. In this case, the corresponding rod 15 of the chassis 12 may be made to move downward. However, since the surface of the vessel 14 is thin and fiexible, the rod 15 will not move substantially. Therefore, only the vessel 14 is deformed and moved downward. As a result, part of the silicone oil 13 in the vessel 14 is moved from a portion of the vessel 14 above the rod 15 to another portion below the rod 15. Since the silicone oil 13 is moved inside the vessel 14, a fluidic resistance occurs to absorb the vibration acting on the frame 7. The vibration transfer to the mechanism deck 1 can thus be limited.

When the frame is moved backward and forward (along the line indicated by arrow a of FIG. 2), the same damping effect as in the vertical vibrations (perpendicular to arrow a of FIG. 2) shown in FIG. 6A occurs, except that the longitudinal sectional view of FIG. 6A is replaced with a cross-sectional view. When the frame is vibrated to the right and left, the vessel 14 is deformed as shown in FIG. 6B. Vibrations acting externally on the frame 7 can be substantially absorbed in the same manner as the vertical vibrations described above.

Figure 7:
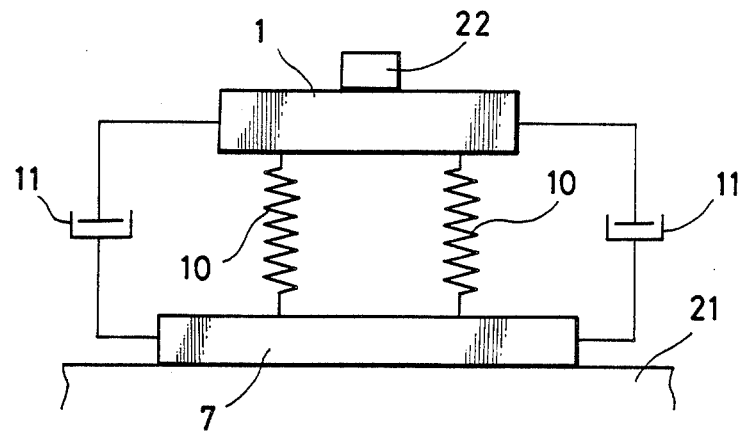
FIG. 7 is a schematic view showing a test vibration system in the optical disk player of FIG. 2.

Test results of the optical disk player of the embodiment described above will be given with reference to FIGS. 7 and 8. As shown in FIG. 7, a test was made such that the vibration system in FIG. 7 is placed on a vibrator 21, a vibration force of 0.5 G is applied on the vibration system, and vibrations of the mechanism deck 1 are measured by a pickup 22 arranged on the chassis 12. Curve D in FIG. 8 shows vibration transfer characteristics along the vertical, back-and-forth (backward and forward along the line indicated by arrow a of FIG. 2), and right-and-left (horizontal directions perpendicular to arrow a of FIG. 2) directions. As shown in FIG. 8, although a slightly high Q value is given near a resonant region 10, the damping effect is far greater than in the case of FIG. 1.

Curves E, F and G in FIG. 8 are antivibration curves representing the limits of sound omissions along the vertical, back-and-forth, and right-and-left direcitons. These curves show the limits of external Gs acting on the frame 7 to cause sound omissions. The hatched portion of curves F and G in FIG. 8 are indefinite portions caused by structural limitations of the measuring instruments and the test object of interest. The values to be plotted in these hatched regions may be higher than those plotted in FIG. 8. Vertical vibrations at a frequency of 20 Hz cause sound omissions when a vibration force of about 2.2 G or more acts on the frame 7. No substantial sound omissions occur at a vibration force corresponding to a frequency of 30 Hz or more.

Figure 2:
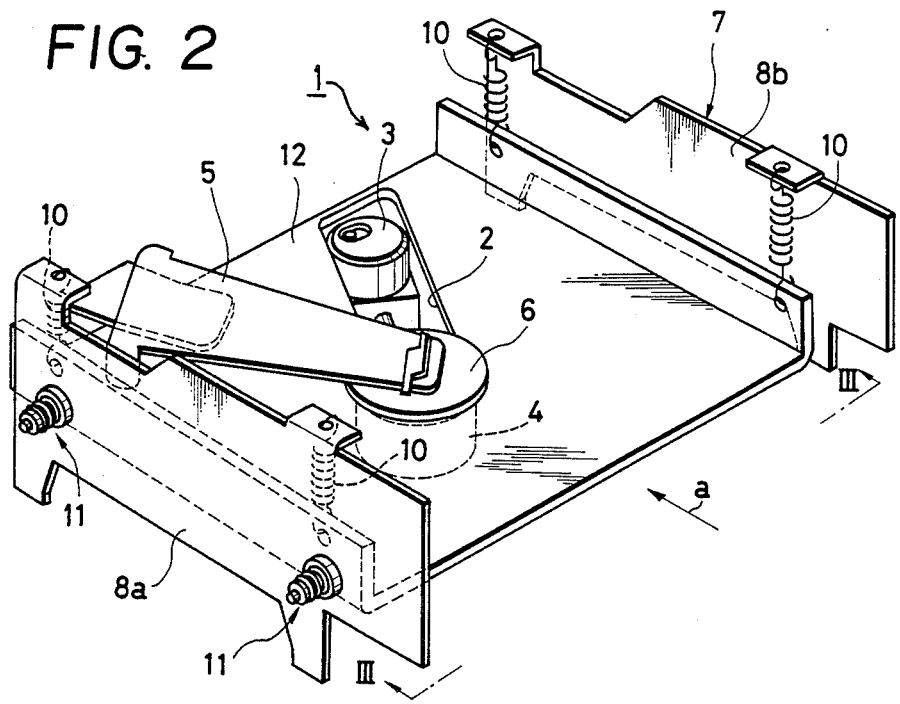
FIG. 2 is a schematic perspective view showing a mechanism deck and a frame of an optical disk player without showing a transverse connecting member of the frame, according to an embodiment of the present invention.
Figure 3:
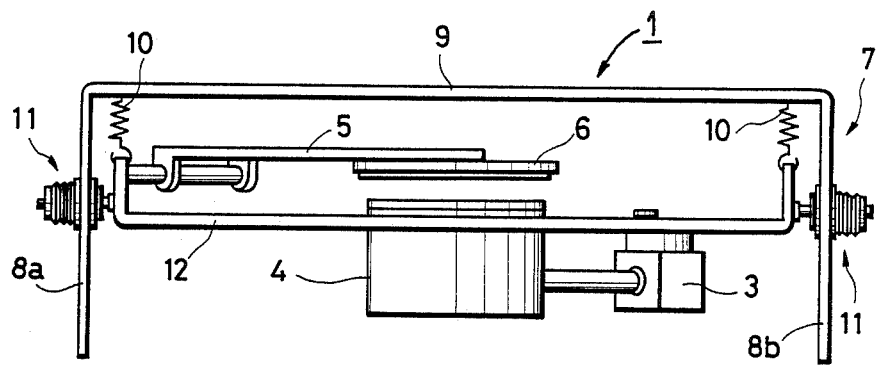
FIG. 3 is a front view of the mechanism deck and the frame taken along the line III—III of FIG. 2.
Figure 9:
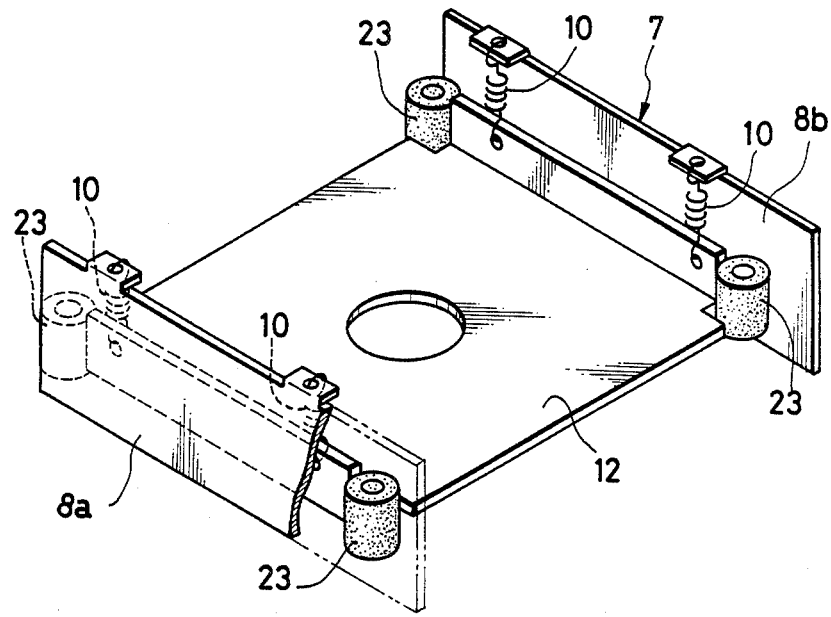
FIG. 9 is a schematic perspective view showing a comparative example using another damper of gelatinous polybutadine in the optical disk player of FIG. 2.
Figure 10:
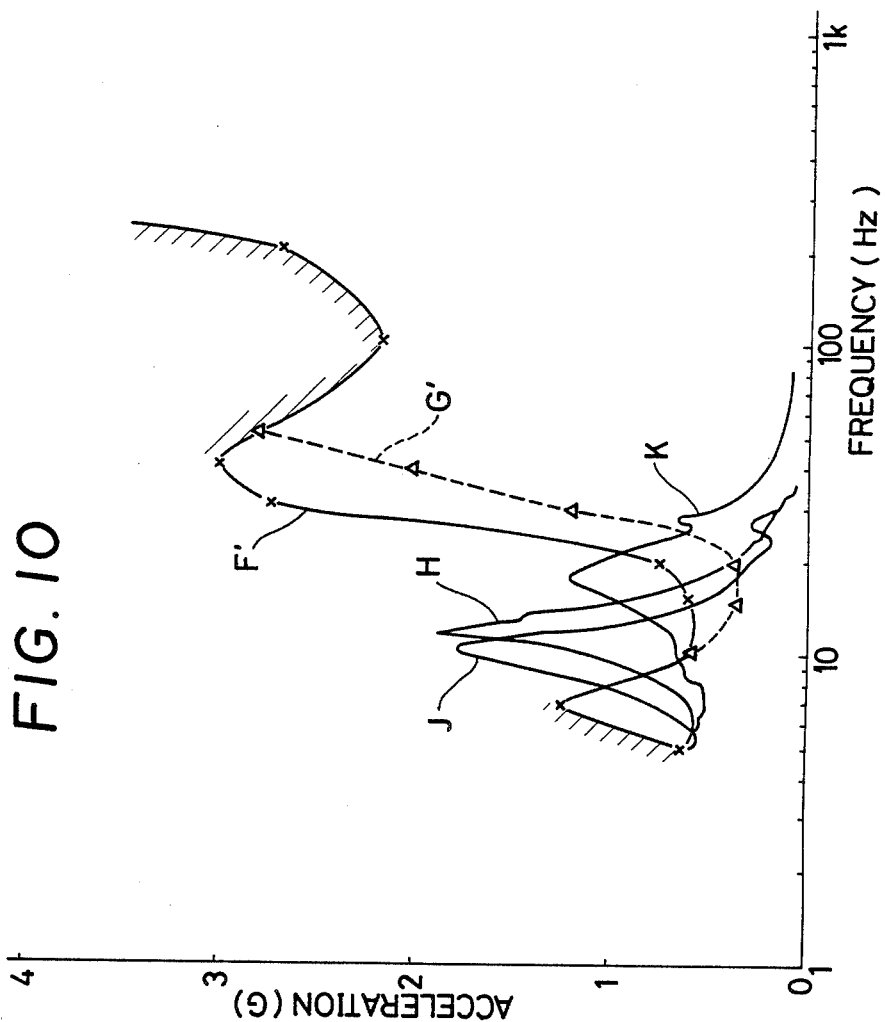
FIG. 10 is a graph showing test results made for the comprtive example of FIG. 9 in the same manner as in FIG. 8.

FIG. 9 shows a comparative example wherein the coil springs 10 are not replaced but the dampers 11 are replaced with other dampers in the embodiment of FIG. 2. Each damper in FIG. 9 comprises a gelatinous polybutadiene cylinder 23 inserted between a mechanism deck 1 and a frame 7. The same test results as in FIG. 8 are obtained for the comparative exmaple, as shown in FIG. 10. Curves H, J and K in FIG. 10 show vibration transfer characteristics along the vertical, back-and-forth and right-and-left direction, respectively. Curves F' and G' represent antivibration characteristics along the back-and-forth and right-and-left directions, respectively. The limits of the Q value and sound omissions in the resonant region according to the embodiment of FIG. 8 are apparently more excellent than those in the comparative example of FIG. 10.

As described above, the damper 11 in the above embodiment is different from the conventional damper having a vessel with two compartments. The damper 11 uses a vessel 14 with only one compartment. The viscous fluid 13 filled in this compartment is shifted to utilize the fluidic resistance. Therefore, the vessel of the damper 11 is compact but can absorb a large vibration force.

The bag constituting the vessel 14 is made of a flexible material having a large internal loss. The rod 15 is neither acted on by external forces nor moved together with the flow of the fluid. The resistance caused by the deformation of the bag clearly plays an important role in absorbing external vibrations. Therefore, although the damper of this embodiment is compact, it can absorb a large vibration force.

In parctice, the silicone oil 13, having a viscosity of 12,500 cP, is filled in the vessel 14 made of silicone rubber to constitute the damper. The viscosity of the fluid to be filled in the vessel may be changed, or the material of the vessel 14 may be replaced with another material, so that the resonant region can be shifted or the slope of the Q curve can be modified. Therefore, the antivibration characteristics of the optical disk player can be made compatible with the vibration characteristics of the moving object in which the optical display player is mounted.

In the above embodiment, the coil springs are used as elastic support means for supporting the chassis (or which are mounted an optical pickup, a disk table, etc.) on the frame. However, the elastic means may comprise an elastic member of another solid material, such as a leaf spring and a rubber cylindrical support.

Industrial Applicability

According to the present invention as described above, the mechanism deck (the unit obtained by mounting the optical pickup, a disk table and the like on the chassis) as the player unit is supported by the frame through an elastic support means such as coil springs. At the same time, vessels filled with viscous fluid are provided at one of the frame and the chasis. The movable members are provided on the other of the frame and the chassis and are arranged in the filled viscous fluid, so that the resistance produced between the viscous fluid and the movable members absorbs external vibrations. Therefore, compared with conventional damping mechanisms using only rubber dampers, the Q curve has a moderate slope in the resonant region, thus improving antivibration characteristics and substantially preventing sound omissions.

We claim:

1. An optical player having a chassis on which an optical pick-up and a disk table are mounted, a plurality of elastic support means resiliently supporting the chassis on a frame for making said chassis displaceable relative to said frame in all directions, and vibration absorbing means for absorbing vibrations from said frame, said vibration absorbing means comprising:
   a rod horizontally projecting from one of said chassis or said frame, and
   a vessel made of rubber, filled with silicone oil and thereafter sealed, said vessel having a hollowed interior portion horizontally and inwardly extending and surrounded by silicone oil to form a central hole for receiving said rod, and a bellows forming the outer periphery of said vessel, and said vessel having a flange which is fixed to the other of said chassis or said frame, whereby said rod is movable in said silicon oil in all directions together with said hollowed interior portion.

2. An optical disk player according to claim 1 characterized in that said vessel is made of silicone rubber.

3. An optical disk player according to claim 1, characterized in that said elastic support means comprises coil springs.

* * * * *